United States Patent
Tanaka

(10) Patent No.: US 8,214,137 B2
(45) Date of Patent: Jul. 3, 2012

(54) IN-VEHICLE INFORMATION APPARATUS AND IN-VEHICLE MULTI-MEDIA SYSTEM

(75) Inventor: Makoto Tanaka, Anjo (JP)

(73) Assignee: DENSO CORPORATION, Kariya (JP)

( * ) Notice: Subject to any disclaimer, the term of this patent is extended or adjusted under 35 U.S.C. 154(b) by 886 days.

(21) Appl. No.: 12/232,829

(22) Filed: Sep. 25, 2008

(65) Prior Publication Data

US 2009/0082961 A1  Mar. 26, 2009

(30) Foreign Application Priority Data

Sep. 26, 2007  (JP) ................................ 2007-250008

(51) Int. Cl.
*G05D 1/08* (2006.01)
(52) U.S. Cl. ............................. 701/208; 701/209; 701/4
(58) Field of Classification Search .............. 701/4, 200, 701/208, 209
See application file for complete search history.

(56) References Cited

U.S. PATENT DOCUMENTS

| 6,055,478 | A | * | 4/2000 | Heron ........................... 701/486 |
| 7,171,305 | B2 | | 1/2007 | Minato et al. |
| 2004/0267446 | A1 | | 12/2004 | Minato et al. |

FOREIGN PATENT DOCUMENTS

| CN | 1760638 A | 4/2006 |
| JP | A-2003-109293 | 4/2003 |
| JP | A-2007-226284 | 9/2007 |

OTHER PUBLICATIONS

Notice of Reason for Rejection issued from the Japanese Patent Office on Aug. 18, 2009 in the corresponding Japanese patent application No. 2007-250008 (and English translation).
First Office Action issued from the Chinese Patent Office on Aug. 3, 2010 in the corresponding Chinese patent application No. 200810161742.7 (with English translation).
Second Office Action issued from the Chinese Patent Office on Dec. 7, 2011 in the corresponding Chinese patent application No. 200810161742.7 (and English translation).

* cited by examiner

*Primary Examiner* — Naeem Haq
(74) *Attorney, Agent, or Firm* — Posz Law Group, PLC

(57) ABSTRACT

When a present position is determined to be included in a high upland area, it is determined whether a presently displayed image can be displayed continuously during the stop of a hard disk drive. For example, a map image may be presently displayed based on map data stored in the hard disk drive. In such a case, displaying the map image cannot be continued in the state of the hard disk drive disabled at the high upland area. Thus, a subsequently displayed image is selected either from an image based on design image data stored in an external memory or from a video obtained from an external video apparatus. The display is changed to the selected image or video.

4 Claims, 4 Drawing Sheets

IN-VEHICLE INFORMATION APPARATUS AND IN-VEHICLE MULTI-MEDIA SYSTEM

CROSS REFERENCE TO RELATED APPLICATION

This application is based on and incorporates herein by reference Japanese Patent Application No. 2007-250008 filed on Sep. 26, 2007.

FIELD OF THE INVENTION

The present invention relates to an in-vehicle information apparatus having a hard disk drive, and an in-vehicle multi-media system comprising the in-vehicle information apparatus.

BACKGROUND OF THE INVENTION

An in-vehicle apparatus such as a navigation apparatus displays a map of the vicinity of a present position on a display screen based on map data, and calculates an optimum route to a destination to thereby navigate the vehicle or driver. A storage medium to store the map data uses a hard disk drive. The hard disk drive, which has a large data volume, further stores music data, application software programs for operating the navigation apparatus, and image or audio data used in an audio function integrated into the navigation apparatus, in addition to the map data.

The navigation apparatus is further used as an in-vehicle multi-media system including the following functions: an output function to output an image or audio obtained from an external audio and video apparatus, such as TV, DVD, or a back monitor for capturing images in back of a vehicle during the backing operation; and an operation function to operate an on-screen operation panel window for in-vehicle apparatuses such as an air conditioner. Thus, in-vehicle apparatuses equipped with hard disk drives have been multi-functional.

The hard disk drive is a storage medium where data are written and read with a magnetic head on a disk to which magnetic materials are applied. During the operation of the hard disk drive, the disk rotating at a high speed rotates an ambient air to generate a pressure. The magnetic head thereby marginally floats above the disk. If the hard disk drive operates under the environment where surrounding atmospheric pressure falls remarkably, the air pressure floating the magnetic head is decreased and the gap between the disk and magnetic head cannot be maintained in the proper state. As a result, the magnetic head may collide with the disk to thereby damage it. Since an atmospheric pressure falls as an altitude rises, the hard disk drive has an application limit in altitude. Generally, the operation guarantee relative to the altitude for the hard disk drive is up to an altitude of 3000 m (about 0.7 atmosphere) to 5000 m (about 0.5 atmosphere).

The countermeasure for preventing damage of the hard disk drive mounted in the in-vehicle apparatus is thereby needed when used at a high upland area (e.g., than 3000, 4000, or 5000 meters) exceeding the guaranteed altitude where the operation of the hard disk drive is guaranteed.

Patent document 1 describes the following technology. When the relevant vehicle ascends up to a predetermined altitude (for example, 3000 m), some map data stored in the hard disk drive are copied or stored also into an external memory. The hard disk drive is then stopped; displaying a map is performed based on the map data stored in the external memory during the travel in the high upland area at an altitude not lower than 3000 m. Thus, such technology stops or disables the hard disk drive at a high upland area to thereby prevent the damage of the hard disk drive while allowing displaying the map.

Such a multi-functional in-vehicle apparatus equipped with a hard disk drive uses design images for display and guidance audio for explanation to users. Design images include various symbol marks, messages, and icons or switches for displaying GUI (Graphic User Interface) for a user to drive various functions. Output use data, which are used for outputting the design images or guidance audio, are needed as design image data or audio data, respectively. The output use data may be stored in the hard disk drive because of a large data volume. Therefore, if a part of the output use data for outputting images and audio stored in the hard disk drive is used for the function, which is assumed to be used at a high upland area, a countermeasure is needed to use the part of the output use data even when the operation of the hard disk drive is stopped.

However, Patent document 1 does not describe the countermeasure against such an event relating to the design image data or audio data.

Patent document 1: JP-2004-317385 A corresponding to U.S. Pat. No. 7,171,305

SUMMARY OF THE INVENTION

It is an object to provide an in-vehicle technology enabling outputs of design images or sounds even when a hard disk drive is disabled at a high upland area.

As an example of the present invention, an in-vehicle information apparatus is provided as follows. A hard disk drive functioning as a first data storage medium is included for storing data, wherein an output including at least one of image displaying and audio sounding is performed based on the data read from the hard disk drive. The data stored in the hard disk drive includes first output use data, the first output use data including at least one of (i) design image data for displaying a design image and (ii) audio data for sounding an audio. An altitude determination portion is included for determining whether an altitude of a present position is equal to or greater than a predetermined altitude, wherein an operation of the hard disk drive is prohibited in a high upland area having an altitude equal to or greater than the predetermined altitude. A second storage medium is included for storing second output use data corresponding to a portion of the first output use data in the hard disk drive. The portion of the first output use data is assumed to be used in the high upland area. The second output use data has a data volume smaller than the first output use data. A control device is included for switching to perform an output from based on the data read from the hard disk drive to based on the second output use data read from the second storage medium when an altitude of a present position is determined to be equal to or greater than the predetermined altitude.

Herein, "a predetermined altitude" may signify, for instance, an upper limit of an altitude where an operation of the hard disk drive is guaranteed, or an altitude reaching a lower limit of an atmospheric pressure at which an operation of the hard disk drive is guaranteed.

In addition, the second storage medium may be naturally required to be sufficiently usable even in a high upland area exceeding the predetermined altitude or to be at least have an upper limit of an altitude for the operation sufficiently higher than the predetermined altitude. For example, a nonvolatile semiconductor memory, an optical disk, or magneto-optical disc can be used as the second storage medium.

Under the above configuration of the in-vehicle information apparatus, even in the midst of stopping the hard disk drive in the high upland area, outputting the design image or guidance audio can be realized by accessing the second storage medium previously recording output use data, which is a part of the output use data stored in the hard disk drive and assumed to correspond to the function used at the high upland area. This can enhance the reliability of the in-vehicle apparatus and convenience of the user in the high upland area.

As another example of the present invention, an in-vehicle multi-media system is provided as follows. The above in-vehicle information apparatus is included. Herein, the hard disk drive of the in-vehicle information apparatus further stores map data and program to thereby provide a navigation function for navigating to a destination based on the map data read from the hard disk drive. An audio and video data source is included for providing data for at least one of displaying an image and sounding an audio. Herein, the control device of the in-vehicle information apparatus is further configured to (i) perform an output at least including one of image displaying and audio sounding based on data from the audio and video data source, independent of the data stored in the hard disk drive, and (ii) switch to perform an output after switching based on either the second output use data read from the second storage medium of the in-vehicle information apparatus or the data from the audio and video data source, according to either an automatic manner or an instruction from a user, when an altitude of a present position is determined to be equal to or greater than the predetermined altitude.

As another example of the present invention, a method is provided for performing in a vehicle an information output at least including one of image displaying and audio sounding based on data stored in a hard disk drive functioning as a first data storage medium. Herein, the data stored in the hard disk drive includes first output use data, which include at least one of (i) design image data for displaying a design image and (ii) audio data for sounding an audio. The method comprises: (i) storing in a second storage medium, second output use data corresponding to a portion of the first output use data in the hard disk drive, the portion of the first output use data being assumed to be used in a high upland area having an altitude equal to or greater than a predetermined altitude, the second output use data having a data volume smaller than the first output use data; (ii) determining whether an altitude of a present position is equal to or greater than the predetermined altitude; and (iii) switching to perform an output from based on the data read from the hard disk drive as the first storage medium to based on the second output use data read from the second storage medium while prohibiting an operation of the hard disk drive when an altitude of a present position is determined to be equal to or greater than the predetermined altitude.

As another example of the present invention, a computer readable medium is provided by comprising instructions being executed by a computer, the instructions including the above method for performing the information output, the method being computer-implemented.

As yet another example of the present invention, an in-vehicle information apparatus is provided as follows. A hard disk drive functioning as a first data storage medium is included for storing data, wherein the data includes first output use data including at least one of (i) design image data for displaying a design image and (ii) audio data for sounding an audio. An output control portion is configured to perform an output at least including one of image displaying and audio sounding based on the data read from the hard disk drive. An altitude determination control portion is configured to determine whether a present position corresponds to a high upland area which has an altitude equal to or greater than a predetermined altitude. A prohibition control portion is configured to prohibit an operation of the hard disk drive in the high upland area. A second storage medium is included for storing at least second output use data corresponding to a portion of the first output use data in the hard disk drive, the portion of the first output use data being assumed to be used in the high upland area, the second output use data having a data volume smaller than the first output use data. An output switch control portion is configured to cause the output control portion to switch to perform an output from based on the data read from the hard disk drive as the first storage medium to based on the second output use data read from the second storage medium when a present position is determined to correspond to the high upland area.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

The following describes an embodiment of the present invention with reference to drawings.

1. Explanation of Configuration of In-Vehicle Multi-Media System

Figure 1:
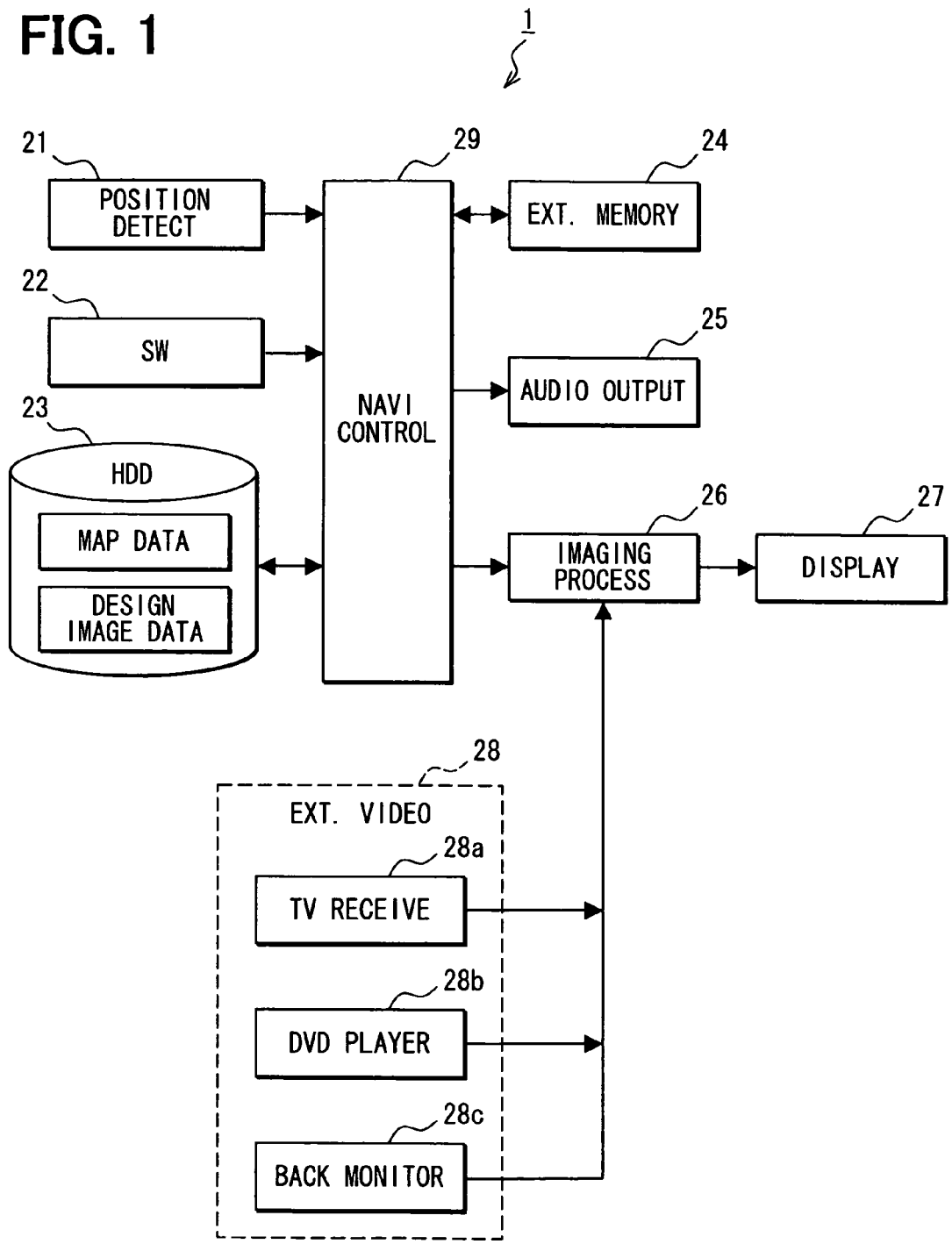
FIG. 1 is a block diagram illustrating an outline configuration of an in-vehicle multi-media system according to an embodiment of the present invention.

FIG. 1 is a block diagram illustrating an outline configuration of an in-vehicle multi-media system 1 provided in a vehicle according to an embodiment of the present invention. Herein, the in-vehicle multi-media system 1 includes a function of an in-vehicle information apparatus.

As illustrated in FIG. 1, the in-vehicle multi-media system 1 includes the following: a position detection device 21 for detecting a present position of the vehicle; an operation switch group 22; a hard disk drive 23 as a first storage medium that is a large data volume storage medium or device to store map data, design element data, programs, etc.; an external memory 24 as a second storage medium for storing the variety of information; an audio output device 25 for outputting the various audio or sounds; an imaging processor 26 for drawing an image for display; a display device 27 for displaying various images on its screen; an external video apparatus 28 as an external audio and video apparatus including various image and audio data sources, such as a television (TV) receiver 28a, a DVD player 28b, and a back monitor system 28c; and a navigation control device 29 for an overall control of the above-mentioned devices, apparatuses, or the like.

The position detection device 21 includes the following sensors or the like: a GPS receiver which receives via a GPS antenna (not shown) electric waves from satellites for GPS (Global Positioning System) and is used for detecting a position of the vehicle; a gyroscope which detects rotational movement exerted over the vehicle; and a distance sensor which detects a travel distance of the vehicle. The individual sensors or the like have different types of detection errors from each other; therefore, they are used to complement each other.

The operation switch group 22 includes a mechanical key switch arranged in the circumference of the display device 27 and a touch sensitive panel integrated into a surface of the screen on the display device 27. The hard disk drive 23 is a storage device which integrally includes a hard disk for storing information, a magnetic head for writing and reading information in the hard disk, a driving portion, and a controller. The hard disk drive 23 reads data from the hard disk based on the control from the navigation control device 29, and inputs the read data to the navigation control device 29. The hard disk drive 23 stores the following data: map data including (i) road data used for map matching, route retrieval, route guidance, etc., and (ii) drawing data for map display; route guidance data; design image data which include (i) icons and switches constituting GUI, (ii) symbol marks, and (iii) messages; and a program for operating the in-vehicle multi-media system 1. In addition, the hard disk drive 23 is assumed to be guaranteed a normal operation in an operating environment at an altitude of 5000 m or less, or at an atmospheric pressure of a 0.5 atm or more.

The external memory 24 is used for storing a portion of the design image data stored in the hard disk drive 23, and other data including data for determining high upland areas, which is to be explained later. The external memory 24 uses a storage medium or device, such as a non volatile semiconductor memory, in which memory contents are electrically or magnetically rewritable and retained even at power-off.

The audio output device 25 outputs guidance audio or audio guidance message as a result of the process by the navigation control device 29, and sounds based on audio signals outputted from the external video apparatus 28. The imaging processor 26 draws images based on information outputted from the external video apparatus 28 and navigation control device 29, and outputs the drawn images as video signals to the display device 27.

The display device 27 is a color display device having a display screen such as a liquid crystal display. The display device 27 can display various images on the display screen according to inputs of video signals from the imaging processor 26. For example, while the vehicle travels, the display device 27 displays a navigational display window to illustrate, in superimposition, (i) a mark for indicating a present position specified based on detection signals obtained from the position detection device 21 and the map data from the hard disk drive 23, (ii) a guidance route to a destination, (iii) additional data including names, landmarks, symbols for the landmarks, etc. In addition, the display device 27 can further display videos outputted from the external video apparatus 28, and various images such as symbol marks and switches or icons constituting an operation panel window of a touch-sensitive type for operating the various functions in the in-vehicle multi-media system 1.

The TV receiver 28a detects television broadcasting radio waves received via an antenna (not shown) and outputs the obtained image signals to the imaging processor 26. The DVD player 28b is used for reproducing a DVD (for example, DVD-Video) recording images and audio; and the video data read from the DVD player 28b are outputted to the imaging processor 26.

The back monitor system 28c is used for assisting a driver, for instance, in backing operation by displaying an image in back of the vehicle captured by an in-vehicle camera (not shown). Herein, a driving assisting image can be generated such that the image captured by the camera is accompanied by a guidance display, which is obtained through imaging process based on the captured image. Video signals of the generated driving assisting image is outputted to the imaging processor 26.

The navigation control device 29 functioning as a control means or device includes a known microcomputer having a CPU, ROM, RAM, I/O, and a bus line connecting the foregoing components or the like. The navigation control device 29 performs the various processes such as navigation, video/audio output, and controls of in-vehicle devices such as an air-conditioner based on program or data read from the ROM, the hard disk drive 23, or the external memory 24.

For example, processes for the navigation include a map display process, and a route guidance process. The map display process calculates a present position of the vehicle based on each detection signal from the position detection device 21 and reads map data of a vicinity of the calculated present position from the hard disk drive 23 to thereby display a map of the vicinity of the present position in the display device 27. In addition, the route guidance process calculates a guidance route which is an optimal route from a present position to a destination based on position data stored in the hard disk drive 23 and a destination designated via the operation switch group 22, and navigates a user up to the destination in consideration of the relation between the present position and the guidance route. The technique of designating the guidance route automatically uses, for instance, the known Dijkstra method as a cost calculation method. Thus, the navigation control device 29 can function as an example of a navigating means or portion, and an output means or portion for performing an output at least including one of image displaying and audio sounding.

Herein, the in-vehicle multi-media system 1 is assumed to be used in a high upland area, which may be defined as an upland area equal to or greater than a predetermined altitude, for instance, 5000 meters high. For instance, the predetermined altitude may correspond to a maximum altitude guaranteed for a normal operation of the hard disk drive 23. Therefore, when the relevant vehicle reaches a high upland area at an altitude of not less than 5000 m, the navigation control device 29 prohibits the operation of the hard disk drive 23 to prevent damage due to operating the hard disk drive 23 at the high upland area. Thus, the navigation control device 29 can function as an example of a prohibition means or portion for prohibiting an operation of the hard disk drive.

Further, processes for the video/audio output includes a process to output video/audio based on video/audio signals either from selection by a user or from higher prioritized one among the video/audio data sources of the TV receiver 28a, DVD player 28b, and back monitor system 28c. For example, when the television broadcasting is selected, the television images and sounds received via the TV receiver 28a are outputted. In addition, when the vehicle moves backward, for instance, in a backing operation, the display on the screen is switched to the video output by the back monitor system 28c automatically to thereby display the driving assisting image.

Further, processes for the controls of the in-vehicle devices such as an air conditioner includes a process to display (i) operation switches or icons for operating each in-vehicle device and (ii) symbol marks in the display device 27, and controls the relevant in-vehicle device according to an operation instruction from a user. For example, the process for the control of the air-conditioner displays operation switches for executing various operations such as start/stop, air volume/ temperature adjustment, and controls the air-conditioner according to an operation instruction by a user.

Furthermore, the navigation control device 29 executes a high upland display control process during the travel of the vehicle as a characteristic process of the present embodiment. In the process, the navigation control device 29 determines whether an image presently displayed can be continuously displayed even during the stop of the hard disk drive 23 when it is determined that the present position corresponds to a high upland area or is included in the high upland area. For example, when a map image based on the map data stored in the hard disk drive 23 is displayed at the present time, it becomes impossible to continue displaying the map image in the state, where the hard disk drive 23 is stopped because of existing in the high upland area. In such a case, the navigation control device 29 selects either an image based on the design image data stored in the external memory 24 or a video by the external video apparatus 28, and changes the display to the selected image or video. The detail of the high upland display control process is mentioned later.

The external memory 24 previously records or stores a portion of the design image data in the hard disk drive 23. Thus, the design image data stored in the external memory 24, which may be referred to as second output use data, is naturally not greater in the data volume than the design image data stored in the hard disk drive 23, which may be referred to as first output use data. That portion of the design image data is used for a function, which is assumed to be used at a high upland area, for example, operation of an in-vehicle device such as an air-conditioner. Furthermore, the portion of the design image data may be reduced in the data volume enabled to be contained in the data storage capacity of the external memory 24 as needed. The corresponding reduced design image data may be stored in the external memory 24 instead of the original portion of the design image data. Herein, an image based on the corresponding reduced design image data can be displayed as being practically comparable with an image based on the original portion of the design image data.

In the above embodiment, the external memory 24 can function as an example of a second storage medium or an output use storage means or portion; and the detecting position device 21 and the navigation control device 29 can function as an altitude determination means or portion. Furthermore, as explained above, the navigation control device 29 can function as an example of a navigation means or portion, an output means or portion for outputting performing an output at least including one of image displaying and audio sounding, and a prohibition means or portion for prohibiting an operation of a hard disk drive.

2. Explanation of High Upland Display Control Process

A high upland display control process executed by the navigation control device 29 is explained with reference to FIGS. 2 to 4.

Figure 2:
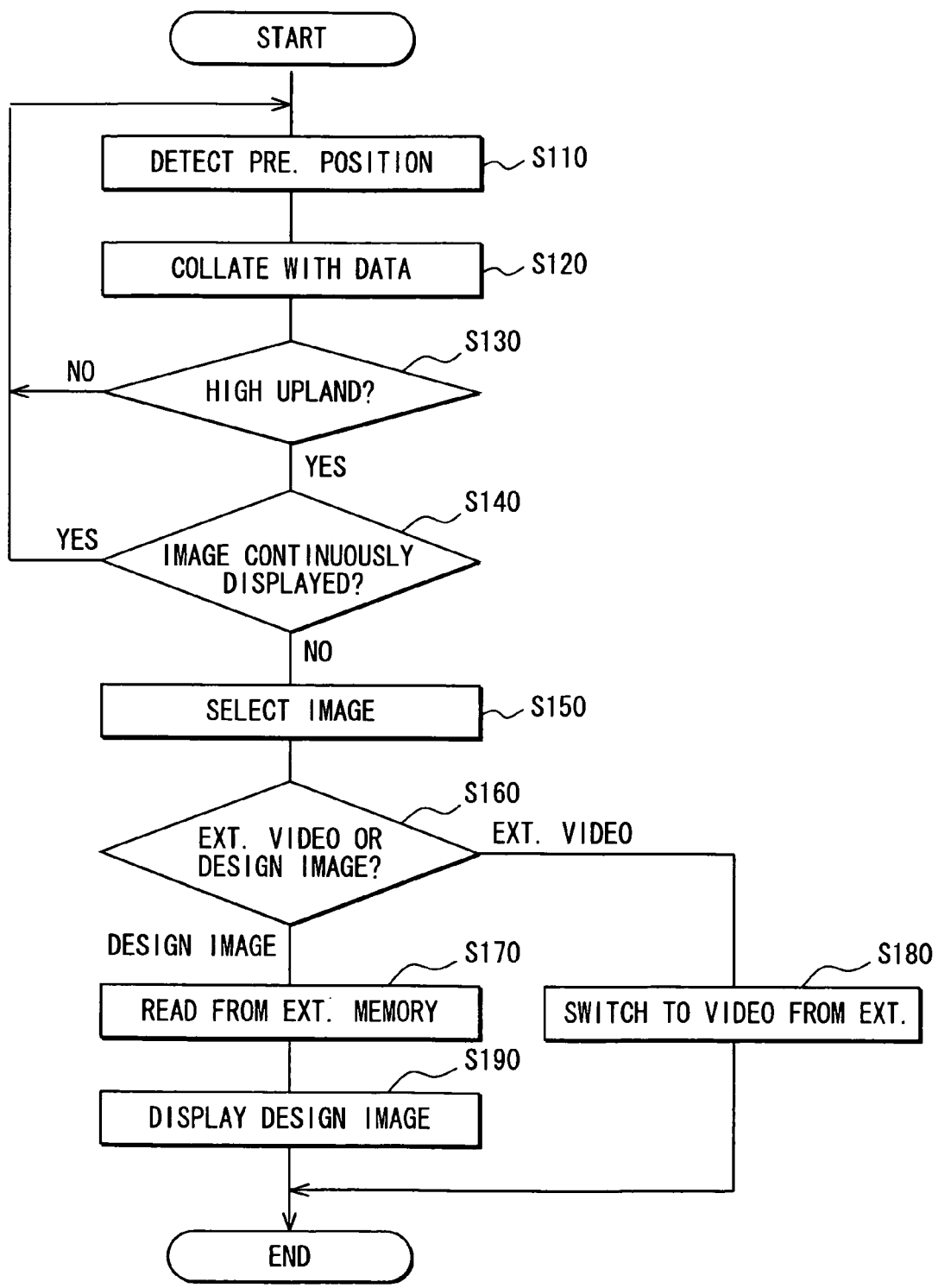
FIG. 2 is a flowchart of a high upland display control process.

FIG. 2 is a flowchart of the high upland display control process. The process is executed in parallel with various processes such as the above-mentioned map display process and the route guidance process.

The navigation control device 29 detects a present position of the vehicle based on an input detection signal from the position detection device 21 at S110. The detected present position is collated with data for determining high upland areas stored in the external memory 24 at S120.

Herein, the data for determining high upland areas is explained based on FIG. 3. FIG. 3 illustrates an outline of the data for determining high upland areas generally. The data for determining high upland areas are allocated individually with signs for identifying whether each of divisions in meshes corresponds to or is included in a high upland area. Herein, the divisions in meshes are formed by dividing a map coordinate plane at predetermined latitudes and longitudes.

Figure 3A:
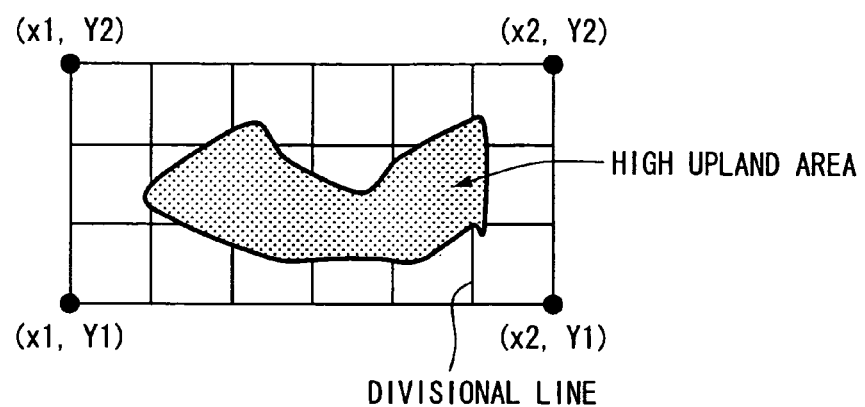
FIGS. 3A, 3B are drawings schematically illustrating an outline of data for determining high upland areas.
Figure 3B:
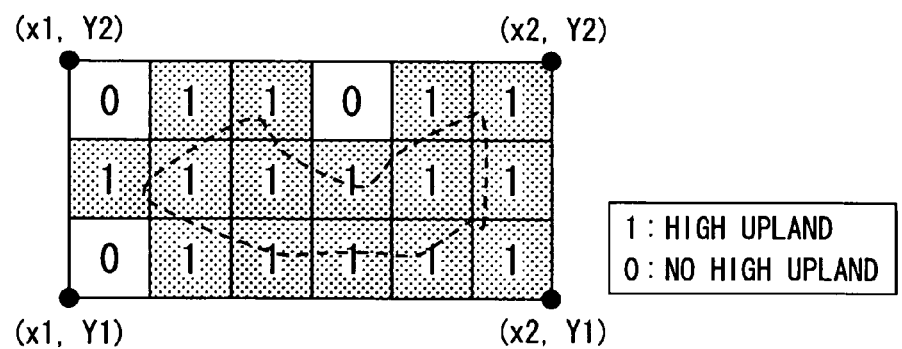
Figure 4:
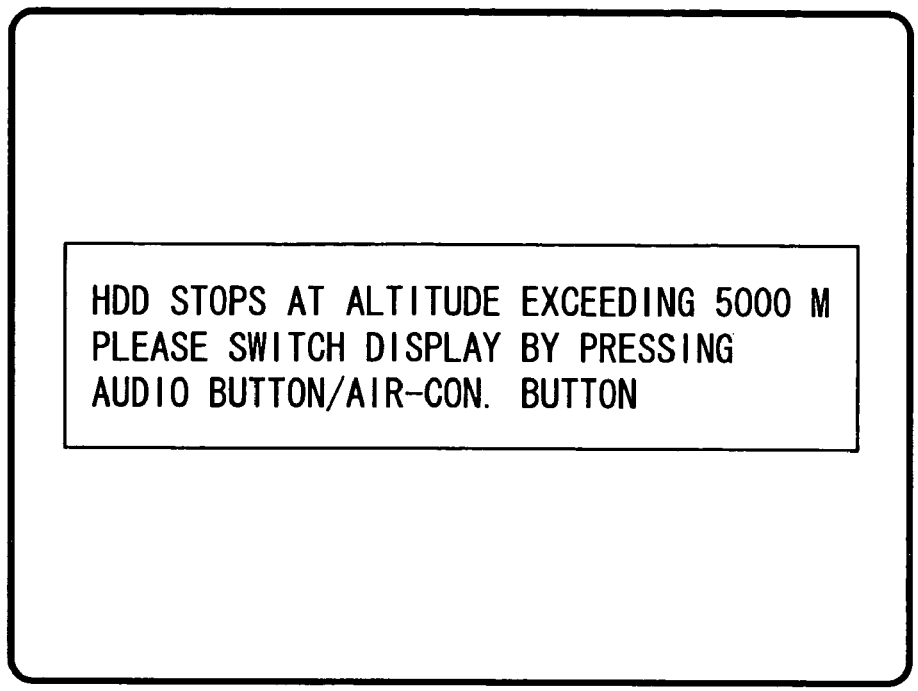
FIG. 4 is a diagram illustrating an example of a message for requesting a user to change a display.

For example, FIG. 3A shows a map coordinate region having four corner points or vertexes of latitude and longitude coordinates (X1, Y1), (X2, Y1), (X1, Y2), and (X2, Y2). Herein, a high upland area having an altitude equal to or greater than 5000 m high is shown as a shaded portion surrounded by the bold line around a center of the region. When generating the data for determining high upland areas corresponding to the above map coordinate region, the region needs to be divided more finely into the divisions. Then, each division is assigned with "1" or "0" as illustrated in FIG. 3B. That is, the division assigned with "1" includes a whole or at least a part of a high upland area having an altitude equal to or greater than 5000 m high; in contrast, the division assigned with "0" does not include any part of the high upland area. Thus defined data for determining high upland areas may be prepared with respect to some or all of a map coordinate region generated by the map data stored in the hard disk drive 23. Further, the data for determining high upland areas are stored as a table defining whether each division corresponds to a high upland area in the external memory 24.

Returning to the explanation of FIG. 2, at S120, a division corresponding to the detected present position is referred to in the above-mentioned table and a sign of "1" or "0" assigned to that division is read from the table. Based on the result of the reference to the table, it is determined whether the present position corresponds to a high upland area at S130. Herein, when the data corresponding to the present position is assigned with "0," it is determined that the present position does not correspond to a high upland area (S130: No). The processing thus returns to S110.

In contrast, when the data corresponding to the present position is assigned with "1," it is determined that the present position corresponds to a high upland area (S130: Yes). It is then determined at S140 whether a presently displayed image can be an image which is allowed to be displayed continuously during the stop of the hard disk drive 23. Herein, for instance, if a map of the vicinity of a present position is displayed based on the map data read from the hard disk drive 23, it becomes impossible to read image data to be subsequently displayed when the hard disk drive 23 is stopped. Thus, it is determined that the presently displayed image cannot be displayed continuously during the stop of the hard disk drive 23. In contrast, for example, if an image from the TV receiver 28a, DVD player 28b, or the back monitor system 28c is displayed, it is determined that the presently displayed image can be continuously displayed even during the stop of the hard disk drive 23.

When it is determined that the presently displayed image can be continuously displayed even during the stop of the hard disk drive 23 (S140: Yes), the processing returns to S110. When it is determined that the presently displayed image cannot be continuously displayed during the stop of the hard disk drive 23 (S140: No), an image used as a substituting display image (or referred to as a display image after switching) is selected at S150. Herein, the image used as the substituting display image is selected from an image formed by the design image data stored in the external memory 24 or from an image or video outputted from the external video apparatus 28.

For instance, if a video signal is input from a video data source having a high necessity for a user and the display thereof is highly prioritized, an image corresponding to such a video signal is selected as the substituting display image automatically. Such highly prioritized display image includes a video inputted from a device relating to safe driving such as the back monitor system 28c, an image of operation switches for operating a frequently used function and maintaining comfort in the vehicle compartment, for instance.

Otherwise, a substituting display image can be determined based on an instruction of selection by a user. In such a case, a message illustrated in FIG. 4 may be displayed in the display device 27. Further, the same or comparable message may be sounded or announced via the audio output device 25. The displayed or sounded message urges a user to input an operation to select a substituting display image, and a selection instruction from the user can be received via the operation switch group 22. For example, an image of entertainment type may be suitable for a user to select as a substituting display image. The image of entertainment type can be obtained from the audio/visual apparatuses such as the TV receiver 28a or DVD player 28b.

After selecting the substituting display image at S150, it is determined at S160 whether the substituting display image is a video by the external video apparatus 28 or a design image formed based on the design image data.

When it is determined that the substituting display image is a design image, for instance, an operation window for an air-conditioner, formed based on the design image data (S160: design image), design image data required for the display of the image is read from the external memory 24 at S170. Design image formed based on the read design image data is displayed in the display device 27 via the imaging processor 26 at S190.

When it is determined that the substituting display image is a video by the external video apparatus 28 (S160: external video), the display is changed to the video outputted from the external video apparatus 28 via the imaging processor 26 at S180. Thus, the navigation control device 29 can function as an example of an output switch means or portion.

3. Effect

According to the in-vehicle multi-media system 1 of the present embodiment, the following effects may be obtained. Even in the midst of stopping the hard disk drive 23 in a high upland area, a design image can be displayed by accessing the external memory 24 previously recording a portion of the design image data used for a function assumed to be used at the high upland area. Thus the reliability of the in-vehicle multi-media system 1 and convenience of a user can be improved at high upland areas.

In addition, it is also possible to change to an image or video outputted from the external video apparatus 28. In the high upland area in which the operation of the hard disk drive 23 is restricted, the change to the image display which does not depend on the hard disk drive 23 can be thus executed variously.

4. Other Embodiments

Although the embodiment is described above, the present invention is not limited to the embodiment and can be modified in various manners.

For example, the present invention is applicable not only to the in-vehicle multi-media system 1 of the above embodiment but also to an in-vehicle apparatus, such as a car audio which uses a hard disk drive as a data storage medium.

In addition, in the above embodiment, a portion of the design image data stored in the hard disk drive 23 are stored to the external memory 24. Without limiting to only the design image data, the external memory 24 can also store audio data such as audio guidance message used in a function assumed to be used in high upland areas. Thus, when the hard disk drive 23 is stopped in a high upland area, the audio guidance message can be also outputted at the high upland area based on the audio data read from the external memory 24 like the design image data.

In addition, an altitude of a present position may be differently acquired with the following procedure. Assume that the GPS receiver of the position detection device 21 can acquire radio wave signals from four or more GPS Satellites. In such a case, the altitude of the present position can be specified with the three-dimensional positioning based on the received radio wave signals. Thus, whether the present position corresponds to a high upland area can be determined based on the specified altitude. In addition, an altitude may be specified based on an atmospheric pressure measured by an atmospheric pressure sensor, for example.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network. For instance, the computer-readable storage medium includes a magnetic/optical/magneto-optical disk, a hard disk drive, a ROM, a RAM, a memory card, etc.

It will be obvious to those skilled in the art that various changes may be made in the above-described embodiments of the present invention. However, the scope of the present invention should be determined by the following claims.

What is claimed is:

1. An in-vehicle information apparatus comprising:
a hard disk drive that functions as a first data storage medium for storing data, wherein an output including at least one of image displaying and audio sounding is performed based on the data read from the hard disk drive, wherein the data stored in the hard disk drive includes first output use data, the first output use data including at least one of (i) design image data for displaying a design image and (ii) audio data for sounding an audio;
an altitude determination portion for determining whether an altitude of a present position is equal to or greater than a predetermined altitude, wherein an operation of the hard disk drive is prohibited in a high upland area having an altitude equal to or greater than the predetermined altitude;
a second storage medium for storing second output use data corresponding to a portion of the first output use data in the hard disk drive, the portion of the first output use data being assumed to be used in the high upland area, the second output use data having a data volume smaller than the first output use data; and
a control device that switches to perform an output from based on the data read from the hard disk drive to based on the second output use data read from the second storage medium when an altitude of a present position is determined to be equal to or greater than the predetermined altitude, wherein:

when an altitude of a present position is determined to be equal to or greater than the predetermined altitude, the control device is further configured to determine data for the output performed after switching, based on an instruction from a user;

the control device then reads output use data corresponding to the determined data for the output performed after switching from the second output use data in the second storage medium; and the control device performs an output based on the output use data corresponding to the determined data for the output performed after switching read from the second storage medium.

2. The in-vehicle information apparatus according to claim 1, wherein:

the control device is further configured to perform an output at least including one of image displaying and audio sounding based on data from an external audio and video data source, independent of the data stored in the hard disk drive; and when an altitude of a present position is determined to be equal to or greater than the predetermined altitude, the control device is further configured to switch to perform an output after switching based on either (i) the second output use data or (ii) the data from the external audio and video data source, according to either an automatic manner or an instruction from a user.

3. An in-vehicle multi-media system comprising:

an in-vehicle information apparatus that includes:

a hard disk drive that functions as a first data storage medium for storing data, wherein an output including at least one of image displaying and audio sounding is performed based on the data read from the hard disk drive, wherein the data stored in the hard disk drive includes first output use data, the first output use data including at least one of (i) design image data for displaying a design image and (ii) audio data for sounding an audio;

an altitude determination portion for determining whether an altitude of a present position is equal to or greater than a predetermined altitude, wherein an operation of the hard disk drive is prohibited in a high upland area having an altitude equal to or greater than the predetermined altitude;

a second storage medium for storing second output use data corresponding to a portion of the first output use data in the hard disk drive, the portion of the first output use data being assumed to be used in the high upland area, the second output use data having a data volume smaller than the first output use data; and a control device that switches to perform an output from based on the data read from the hard disk drive to based on the second output use data read from the second storage medium when an altitude of a present position is determined to be equal to or greater than the predetermined altitude wherein the hard disk drive of the in-vehicle information apparatus further stores map data and program to thereby provide a navigation function for navigating to a destination based on the map data read from the hard disk drive; and an audio and video data source that provides data for at least one of displaying an image and sounding an audio, wherein:

the control device of the in-vehicle information apparatus is further configured to perform an output at least including one of image displaying and audio sounding based on data from the audio and video data source, independent of the data stored in the hard disk drive, and switch to perform an output after switching based on either (i) the second output use data read from the second storage medium of the in-vehicle information apparatus or (ii) the data from the audio and video data source, according to either an automatic manner or an instruction from a user, when an altitude of a present position is determined to be equal to or greater than the predetermined altitude.

4. An in-vehicle information apparatus comprising:

a hard disk drive that functions as a first data storage medium for storing data, wherein an output including at least one of image displaying and audio sounding is performed based on the data read from the hard disk drive, wherein the data stored in the hard disk drive includes first output use data, the first output use data including at least one of (i) design image data for displaying a design image and (ii) audio data for sounding an audio;

an altitude determination portion for determining whether an altitude of a present position is equal to or greater than a predetermined altitude, wherein an operation of the hard disk drive is prohibited in a high upland area having an altitude equal to or greater than the predetermined altitude;

a second storage medium for storing second output use data corresponding to a portion of the first output use data in the hard disk drive, the portion of the first output use data being assumed to be used in the high upland area, the second output use data having a data volume smaller than the first output use data; and a control device that switches to perform an output from based on the data read from the hard disk drive to based on the second output use data read from the second storage medium when an altitude of a present position is determined to be equal to or greater than the predetermined altitude, wherein the control device is further configured to perform an output at least including one of image displaying and audio sounding based on data from an external audio and video data source, independent of the data stored in the hard disk drive; and when an altitude of a present position is determined to be equal to or greater than the predetermined altitude, the control device is further configured to switch to perform an output after switching based on either (i) the second output use data or (ii) the data from the external audio and video data source, according to either an automatic manner or an instruction from a user.

* * * * *